(12) United States Patent  
Neumann et al.

(10) Patent No.: US 8,640,100 B2  
(45) Date of Patent: Jan. 28, 2014

(54) DEBUGGING A STATECHART USING A GRAPHICAL PROGRAM

(75) Inventors: Nicholas G. Neumann, Austin, TX (US); Toga Hartadinata, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1965 days.

(21) Appl. No.: 11/743,287

(22) Filed: May 2, 2007

(65) Prior Publication Data

US 2008/0263521 A1    Oct. 23, 2008

Related U.S. Application Data

(60) Provisional application No. 60/913,028, filed on Apr. 20, 2007.

(51) Int. Cl.  
*G06F 9/44* (2006.01)

(52) U.S. Cl.  
USPC ........... 717/124; 717/104; 717/105; 717/125; 717/126

(58) Field of Classification Search  
None  
See application file for complete search history.

(56) References Cited

U.S. PATENT DOCUMENTS

| | | | |
|---|---|---|---|
| 4,802,116 A | 1/1989 | Ward et al. | |
| 4,827,404 A | 5/1989 | Barstow et al. | |
| 4,849,880 A | 7/1989 | Bhaskar et al. | |
| 4,901,221 A | 2/1990 | Kodosky et al. | |
| 4,914,568 A | 4/1990 | Kodosky et al. | |
| 5,109,504 A | 4/1992 | Littleton | |
| 5,377,318 A | 12/1994 | Wolber | |
| 5,437,464 A | 8/1995 | Terasima et al. | |
| 5,481,740 A | 1/1996 | Kodosky | |
| 5,563,991 A | 10/1996 | Mahoney | |
| 5,566,295 A | 10/1996 | Cypher et al. | |
| 5,603,018 A | 2/1997 | Terada et al. | |
| 5,652,909 A | 7/1997 | Kodosky | |
| 5,724,074 A | 3/1998 | Chainani et al. | |
| 5,760,788 A | 6/1998 | Chainini et al. | |
| 5,784,275 A | 7/1998 | Sojoodi et al. | |
| 5,870,590 A | 2/1999 | Kita et al. | |
| 5,920,718 A | 7/1999 | Uczekaj et al. | |
| 5,966,532 A | 10/1999 | McDonald et al. | |
| 6,118,448 A | 9/2000 | McMillan et al. | |

(Continued)

OTHER PUBLICATIONS

Schumann, "Automatic Debugging Support for UML Designs," NASA, 2001.*

(Continued)

*Primary Examiner* — Insun Kang  
(74) *Attorney, Agent, or Firm* — Meyertons Hood Kivlin Kowert & Goetzel, P.C.; Jeffrey C. Hood; Joel L. Stevens

(57) ABSTRACT

System and method for configuring wires in and/or debugging a statechart. The statechart may be created or displayed on a display and may include a plurality of state icons connected by wires. The state icons may represent states and the wires may represent transitions between the states. One or more of the wires may be configured, e.g., according to user input. A graphical program may be created which specifies a debugging operation for the statechart. The statechart may be executed and may provide data to the graphical program. The graphical program may receive first data produced by the statechart, e.g., during execution. The graphical program may perform the debugging operation based on the first data.

20 Claims, 12 Drawing Sheets

(56) References Cited

U.S. PATENT DOCUMENTS

| | | | |
|---|---|---|---|
| 6,138,171 | A | 10/2000 | Walker |
| 6,173,438 | B1 | 1/2001 | Kodosky et al. |
| 6,212,672 | B1 | 4/2001 | Keller et al. |
| 6,219,628 | B1 | 4/2001 | Kodosky et al. |
| 6,285,976 | B1 | 9/2001 | Rotbart |
| 6,366,300 | B1 | 4/2002 | Ohara et al. |
| 6,405,361 | B1 | 6/2002 | Broy et al. |
| 6,499,136 | B1 | 12/2002 | Dempsey et al. |
| 6,715,139 | B1 | 3/2004 | Kodosky et al. |
| 6,880,147 | B1 | 4/2005 | Pauly |
| 7,020,850 | B2 | 3/2006 | Raghavan et al. |
| 7,120,876 | B2 | 10/2006 | Washington et al. |
| 7,197,739 | B2 | 3/2007 | Preston et al. |
| 7,200,838 | B2 | 4/2007 | Kodosky et al. |
| 7,210,117 | B2 | 4/2007 | Kudukoli et al. |
| 7,464,373 | B1* | 12/2008 | Yunt et al. ............ 717/125 |
| 7,496,895 | B1* | 2/2009 | Mosterman et al. ........ 717/124 |
| 7,503,027 | B1 | 3/2009 | Zhao et al. |
| 7,774,172 | B1 | 8/2010 | Yunt et al. |
| 7,840,913 | B1 | 11/2010 | Agrawal et al. |
| 2001/0020291 | A1 | 9/2001 | Kudukoli et al. |
| 2002/0070968 | A1 | 6/2002 | Austin et al. |
| 2002/0083413 | A1* | 6/2002 | Kodosky et al. ............ 717/109 |
| 2002/0191023 | A1* | 12/2002 | Chandhoke et al. ......... 345/771 |
| 2003/0046663 | A1* | 3/2003 | Rogers et al. ............ 717/125 |
| 2003/0167455 | A1 | 9/2003 | Iborra et al. |
| 2004/0255269 | A1* | 12/2004 | Santori et al. ............ 717/109 |
| 2005/0091602 | A1 | 4/2005 | Ramamoorthy et al. |
| 2007/0074184 | A1* | 3/2007 | Raghavan et al. ........... 717/138 |
| 2007/0168943 | A1 | 7/2007 | Marini et al. |
| 2007/0266329 | A1* | 11/2007 | Gaudette ............ 715/763 |
| 2008/0263463 | A1 | 10/2008 | Neumann |
| 2008/0263521 | A1 | 10/2008 | Neumann et al. |

OTHER PUBLICATIONS

"The Boost Statechart Library," Apr. 2007.*
Eva Magnusson; "State diagram Generation" term paper in the graduate course Attribute Grammars; Spring 1999; 21 pages; Lund University.
Simona Vasilache and Jiro Tanaka; "Translating OMT State Diagrams with Concurrency into SDL Diagrams"; Aug. 28-31, 2000; 6 pages plus cover page; University of Tsukuba, Japan.
"Stateflow—For State Diagram Modeling" User's Guide, Version 4; Copyright 1997-2001; pp. 1 through 8-10; The Math Works, Inc.
"Stateflow—For State Diagram Modeling" User's Guide, Version 4; Copyright 1997-2001; pp. 8-11 through 1-16; The Math Works, Inc.
T. Dean Hendrix and James H. Cross; Language Independent Generation of Graphical Representations of Source Code; Proceedings of the 1995 ACM 23rd annual conference on Computer Science; 1995; pp. 66-72.
Hugo Andrade and Scott Kovner; "Software Synthesis from Dataflow models for G and LabVIEW"; IEEE Asilomar Conference on Signals, Systems, and Computers; Nov. 1998; pp. 1705-1709; vol. 2.
K. N. Whitley and Alan F. Blackwell; "Visual Programming: The Outlook from Academia and Industry";Seventh workshop on Empirical studies of programmers; Oct. 1997; pp. 180-208.
David Harel and Eran Gery; "Executable Object Modeling with Statecharts"; IEEE Computer; Jul. 1997; pp. 31-42; vol. 30, No. 7.
David Harel; "On Visual Formalisms"; Communications of the ACM; May 1988; pp. 514-530; vol. 31, No. 5.
David Harel; "Statecharts: A Visual Formalism for Complex Systems"; 1987; pp. 231-257; Elsevier Science Publishers B.V., North Holland.
"LabVIEW User Manual for Windows"; National Instruments Co.; Sep. 1994; 22 pages.
Adam Beguelin, Jack Dongarra, Al Geist, and Vaidy Sunderam; "Visualization and Debugging in a Heterogeneous Environment"; IEEE; Jun. 1993; 8 pages.
Rahman Jamal and Lothar Wenzel; "The Applicability of the Visual Programming Language LabVIEW to Large-Real-World Applications"; IEEE; 1995; 8 pages.
Per-Arne Wiberg; "Graphical Programming of Time-Deterministic Real-Time Systems"; IEEE; 1996; 8 pages.
Bruce D. Douglass; "Custom Embedded Communication Protocols"; Conference Proceedings of Embedded Systems Conference East, Mar. 10-12, 1997, Boston, Massachusetts; 21 pages.
Jean Labrosse; "Inside Real-Time Kernals"; Conference Proceedings of Embedded Systems Conference East, Mar. 10-12, 1997, Boston, Massachusetts; 10 pages.
Jean Labrosse; "Designing with Real-Time Kernals"; Conference Proceedings of Embedded Systems Conference East, Mar. 10-12, 1997, Boston, Massachusetts; 11 pages.
William Stallings; "Operating Systems, 2nd Edition"; Prentice Hall; 1995; "Multiprocessor and Real-Time Scheduling", 21 pages.
International Search Report for PCT/US 98/10916 dated Sep. 17, 1998; 7 pages.
Sam Shearman; "Hardware-in-the-Loop Connectivity Extends Continuous-System Simulation"; Personal Engineering, Jun. 1997; 11 pages.
"LabVIEW User Manual for Windows"; National Instruments Co.; Aug. 1993; 11 pages.
Frank Ludolph, Yu-Ying Chow, Dan Ingalls, Scott Wallace, and Ken Doyle; "The Fabrik Programming Environment"; IEEE; 1988; 9 pages.
Philip Dean Lapsley; "Host Interface and Debugging of Dataflow DSP Systems"; Thesis, 1991, 56 pages.
Edward A. Lee, Edwin Goei, Holly Heine, Wai Ho, Shuvra Bhattacharyya, Jeff Bier, and Erik Guntvedt; "Gabriel: A Design Environment for Programmable DSPs"; 1988; 13 pages.
Edward A. Lee, Wai-Hung Ho, Edwin E. Goei, Jeffrey C. Bier, and Shuvra Bhattacharyya; "Gabriel: A Design Environment for DSP"; IEEE Transactions on Acoustics, Speech, and Signal Processing, vol. 37, No. 11, Nov. 1989; 12 pages.
Jeffrey C. Bier, Edwin E. Goei, Wai H. Ho, Philip D. Lapsley, Maureen P. O'Reilly, Gilbert C. Sih, and Edward A Lee; "Gabriel: A Design Environment for DSP", IEEE Micro Issue—vol. 10, No. 5, 1990, 16 pages.

* cited by examiner

DEBUGGING A STATECHART USING A GRAPHICAL PROGRAM

PRIORITY

This application claims benefit of priority of U.S. provisional application Ser. No. 60/913,028 titled "Configuring and Debugging a Statechart" filed Apr. 20, 2007, whose inventors were Nicholas G. Neumann and Toga Hartadinata which is hereby incorporated by reference in its entirety as though fully and completely set forth herein.

FIELD OF THE INVENTION

The present invention relates to the field of statecharts, and more particularly to a system and method for debugging statecharts using a graphical program.

DESCRIPTION OF THE RELATED ART

Diagrams representing finite state machines (FSMs) have become an increasingly popular way to model and understand systems. Examples include State diagrams and Harel statecharts (referred to herein as statecharts). State diagrams classically include a series of states, state transitions, events, and actions. During execution of such diagrams, a state may transition from one state to another in response to an event. The transition taken may be determined by evaluating conditions associated with each of the specified state transitions. When the conditions for a transition are true, the transition may occur. Additionally, actions may be executed when states are entered or exited (e.g., according to the transitions), in response to a trigger, and/or at other times. In general, state diagrams do not allow for multiple states to be concurrently active.

Statecharts, in contrast, do allow for multiple states to be concurrently active. For example, in statecharts, a superstate may include a plurality of substates that may be concurrently active when the superstate is active. It may be desirable to debug executable statecharts.

SUMMARY OF THE INVENTION

Various embodiments are presented below of methods for debugging statecharts using a graphical program.

A statechart may be displayed on a display and may include a plurality of state icons connected by wires. The state icons may represent respective states and the wires may represent transitions between states (or pseudostates). The statechart may indicate hierarchy among states. For example, one or more of the states may be superstates which include substates. The statechart may be executable to perform first functionality which may be indicated by the plurality of connected state icons.

Displaying the statechart may occur in response to user input. For example, the user may open an existing statechart or create/assemble the statechart on a display. Thus, in one embodiment, displaying the statechart may include displaying the statechart during creation of the statechart. In other words, the statechart may be assembled on the display by the user selecting and placing state icons on the display, and drawing wires between the state icons. Note that the statechart may be created or assembled manually or automatically as desired.

During execution, the transitions may occur according to the configuration of the wires in the statechart. Additionally, the statechart may perform the first functionality.

In some embodiments, debugging the statechart may be desired. A graphical program (e.g., a data flow graphical program) may be created in response to user input. The graphical program may include a plurality of interconnected icons which visually indicate functionality of the graphical program and may specify a debugging operation for a statechart which may be usable to aid in debugging the statechart. The debugging operation may include halting execution of the graphical program and/or statechart or logging data of the statechart. In some embodiments, the graphical program may manipulate or perform functions on the data before it is logged.

An input of the graphical program may be configured to receive data from the statechart, e.g., during execution of the statechart. The data may include state information of the statechart, outputs of the statechart, trigger information of the statechart (e.g., an array or queue of pending triggers or executing triggers), currently active states, and/or other information. In some embodiments, the data may be associated with one or more variables that were defined during creation of the statechart. The data may be usable by the graphical program to perform the debugging operation. For example, the graphical program may use data of variables and/or manipulate the data to perform the debugging operation (e.g., to determine whether or not the statechart should be halted or if data should be logged).

Note that the graphical program may include a GUI or front panel which may be used to indicate current execution data of the statechart and/or receive input from the user. For example, the front panel may include GUI elements or indicators which indicate the information provided by the first data. Additionally, the front panel may include GUI elements for receiving user input, e.g., to halt, slow down, or step through execution of the statechart, to begin or halt logging of data (e.g., one or more portions of the data being received from the statechart), and/or other GUI input elements. In various embodiments, the user may rearrange or change the appearance of the front panel or individual GUI elements.

The statechart may be executed and may provide the data to the graphical program during execution. The graphical program may be correspondingly executed to perform the debugging operation using the provided data. Graphical indications of the data may be displayed by the graphical program, e.g., in the front panel of the graphical program. Additionally, as indicated above, the user may interact with the statechart (e.g., to modify execution of the statechart) using the front panel of the graphical program. Thus, a graphical program may be created to assist in debugging a statechart.

BRIEF DESCRIPTION OF THE DRAWINGS

A better understanding of the present invention can be obtained when the following detailed description of the preferred embodiment is considered in conjunction with the following drawings, in which.

Figure 1A:
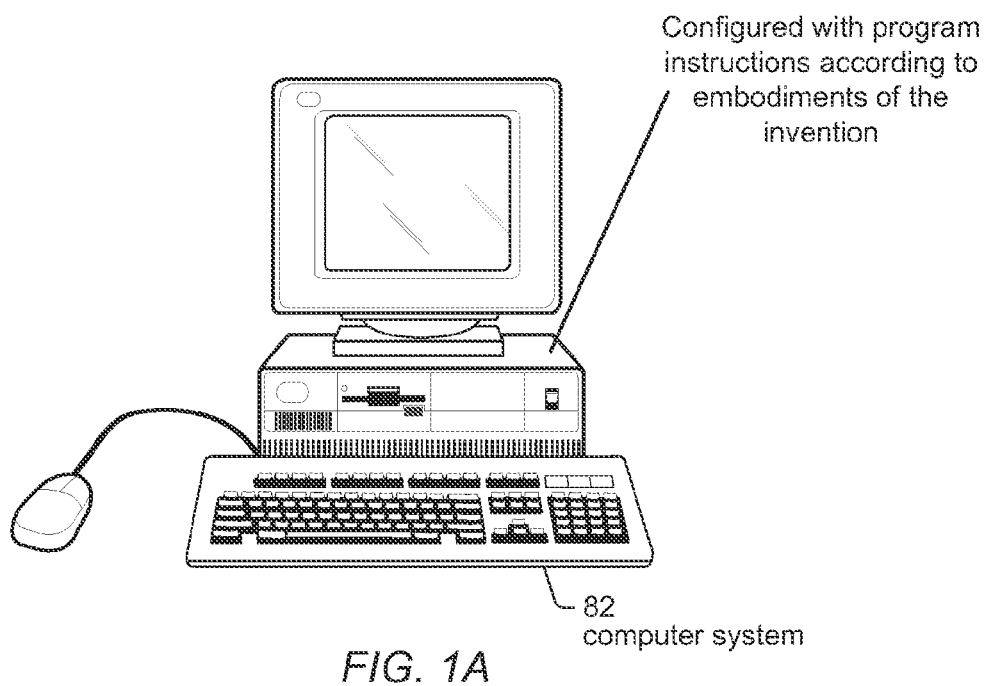
FIG. 1A illustrates a computer system operable to execute a statechart according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,200,838 titled "Method for Automatically Generating a Graphical Program in Response to a State Diagram," filed Dec. 21, 2000.

U.S. Patent Application Publication No. 20010020291 (Ser. No. 09/745,023) titled "System and Method for Programmatically Generating a Graphical Program in Response to Program Information," filed Dec. 20, 2000, which issued as U.S. Pat. No. 7,210,117 on Apr. 24, 2007.

U.S. provisional application Ser. No. 60/913,028 titled "Configuring and Debugging a Statechart" filed Apr. 20, 2007, whose inventors were Nicholas G. Neumann and Toga Hartadinata.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected blocks or icons, wherein the plurality of interconnected blocks or icons visually indicate functionality of the program.

The following provides examples of various aspects of graphical programs. The following examples and discussion are not intended to limit the above definition of graphical program, but rather provide examples of what the term "graphical program" encompasses:

The blocks in a graphical program may be connected in one or more of a data flow, control flow, and/or execution flow format. The blocks may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks are often referred to as the block diagram portion of the graphical program.

Block—In the context of a graphical program, an element that may be included in a graphical program. A block may have an associated icon that represents the block in the graphical program, as well as underlying code or data that implements functionality of the block. Exemplary blocks include function blocks, sub-program blocks, terminal blocks, structure blocks, etc. Blocks may be connected together in a graphical program by connection icons or wires.

The blocks in a graphical program may also be referred to as graphical program nodes or simply nodes.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics.

Wires may indicate communication of data, timing information, status information, control information, and/or other information between icons. In some embodiments, wires may have different visual appearances which may indicate different characteristics of the wire (e.g., type of data exchange semantics, data transfer protocols, data transfer mediums, and/or type of information passed between the icons, among others).

Where wires are displayed in state diagrams or statecharts, the wires may indicate transitions between states that are represented as state icons in the state diagram or statechart.

Graphical Data Flow Program (or Graphical Data Flow Diagram)—A graphical program or diagram comprising a plurality of interconnected blocks, wherein at least a subset of the connections among the blocks visually indicate that data produced by one block is used by another block. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Statechart—A diagram that visually indicates a plurality of states and transitions between the states. The diagram comprises state icons connected by wires, where the state icons represent states and the wires represent transitions between the states.

One or more of the state icons may represent a hierarchical state, where a hierarchical state is a state that includes one or more sub-states. For example, a statechart may include a state (a superstate) which includes states (substates). The substates may be AND states (e.g., parallel or concurrently active states) or OR states (e.g., states which are not concurrently active). The statechart may also include pseudostates (e.g., forks, joins, and/or junctions).

The statechart may be represented in the memory of the computer system as data structures and/or program instructions. The representation of the statechart stored in memory corresponds to the diagram and is either 1) executable; 2) operable to be converted to an executable program; or 3) interpretable, to perform the functionality indicated by the diagram.

A "State Diagram" is a type of statechart which does not have hierarchical states.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1A—Computer System

FIG. 1A illustrates a computer system 82 operable to implement the methods described herein. One embodiment of a method for debugging a statechart is described below.

As shown in FIG. 1A, the computer system 82 may include a display device operable to display the statechart as the statechart is created and/or executed. The display device may also be operable to display a graphical user interface (e.g., a data viewer or debugging GUI) of the statechart during execution of the statechart. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more statecharts and/or graphical programs which are executable to perform the methods described herein. Additionally, the memory medium may store a development environment application used to create and/or execute such statecharts and/or graphical programs. The memory medium may also store operating system software, as well as other software for operation of the computer system. Various embodiments further include receiving or storing instructions and/or data implemented in accordance with the foregoing description upon a carrier medium.

Figure 1B:
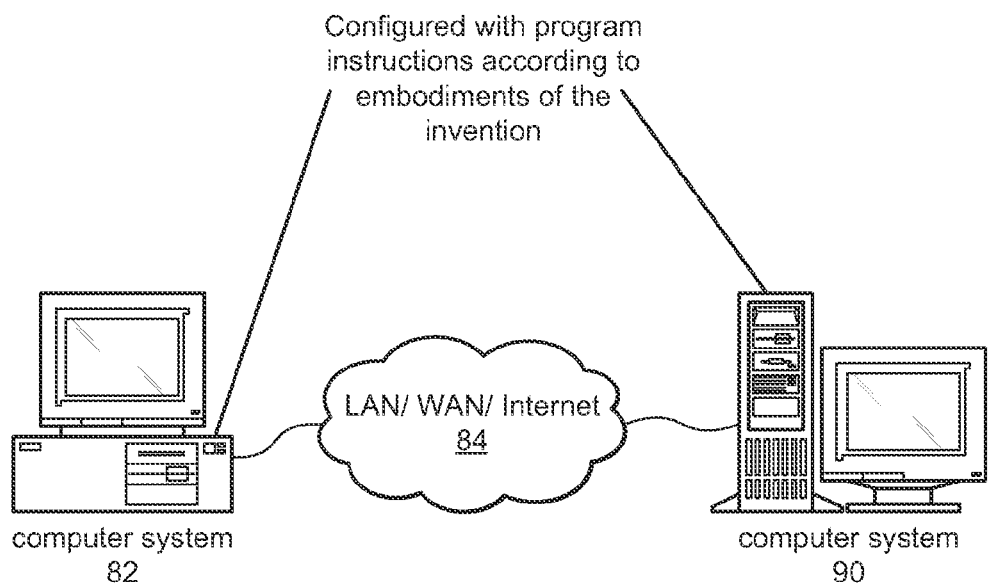
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a statechart or graphical program (which may include the statechart) in a distributed fashion. For example, computer 82 may execute a first portion of the statechart and/or graphical program and computer system 90 may execute a second portion of the statechart and/or graphical program.

In one embodiment, portions of the graphical programs and/or statecharts may execute on a device. The device may include a programmable hardware element and/or may include a processor and memory medium which may execute a real time operating system. In one embodiment, the graphical program/statechart may be downloaded and executed on the device. For example, the development environment may provide support for downloading the graphical program and/or statechart for execution on the device, e.g., in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2:
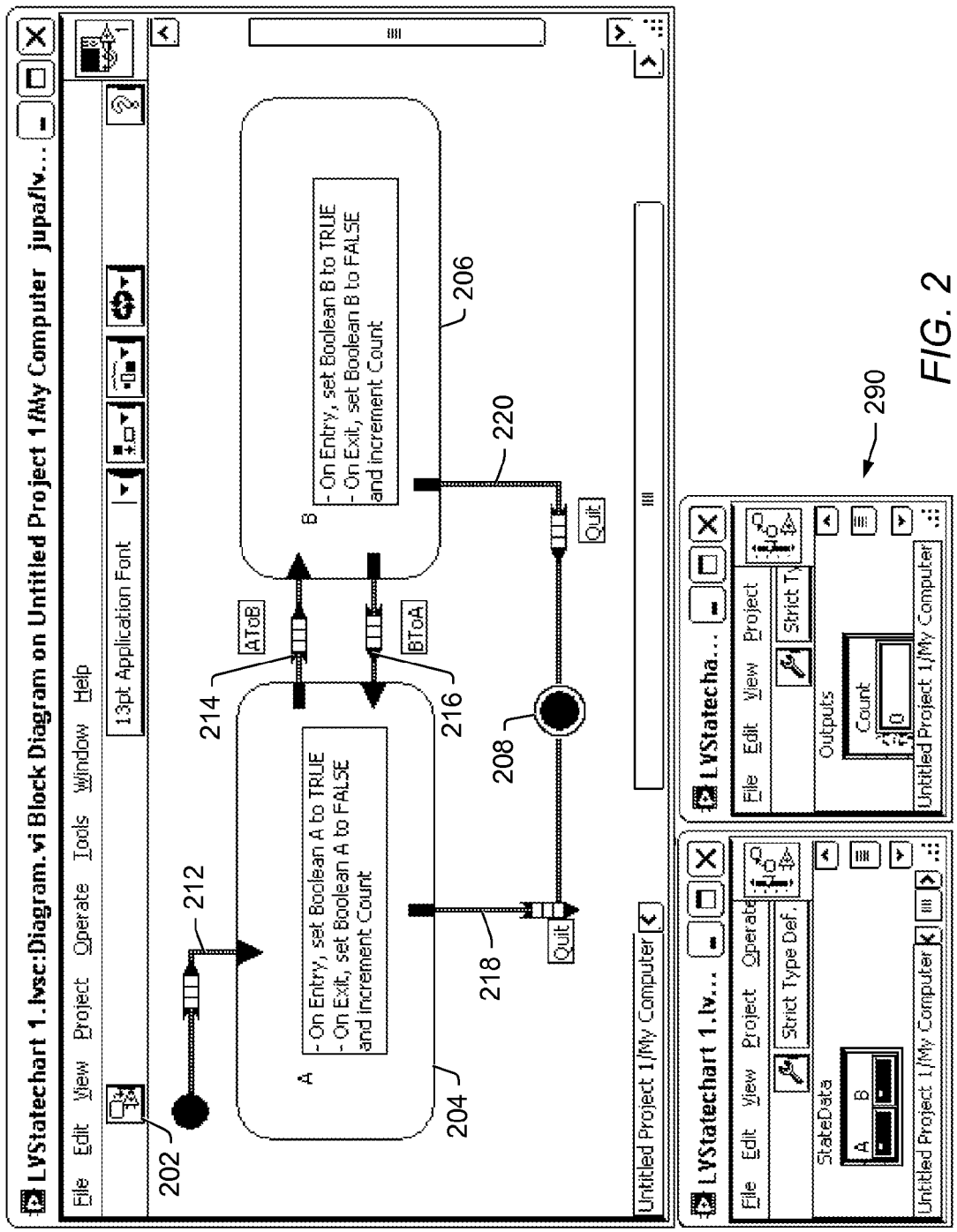
FIG. 2 illustrates an exemplary statechart developing environment with a statechart and associated graphical user interfaces according to one embodiment.

FIG. 2—Exemplary Statechart

As described above, a statechart may include a plurality of state icons connected by wires. The state icons may correspond to respective states and the wires may represent transitions between states (or to and/or from states). Thus, the statechart may include a plurality of state icons which represent states.

In some embodiments, the statechart may include at least one superstate icon which includes one or more substates. As discussed above, the one or more substates may be currently active (e.g., during execution of the statechart) when the superstate is active. Note that the substates may also be superstates. For example, the statechart may include states that themselves include statecharts. Thus, the statechart may indicate a hierarchy among states.

Note that the statechart may be executable to perform first functionality, and the plurality of state icons connected by wires may indicate that functionality. As used herein, references to execution of the statechart (or that it may be executable) refers to execution of data structures or program instructions represented by the statechart, compilation or conversion of the data structures to a form that is executable (e.g., to a graphical program), and/or interpretation. During execution, functionality represented by the statechart (e.g., the states and transitions represented in the statechart) may be performed.

Note further that the statechart performing actions during execution of the statechart may actually refer to actions that are performed by program instructions converted or compiled from the statechart performing the actions. For example, the statechart transitioning from one state to another may refer to corresponding actions being performed during execution of the program instructions created from the statechart. Additionally, where the program instructions are compiled or converted from the statechart, the program instructions may cause the statechart to change its appearance during execution (e.g., indicating current states of execution, transitions, etc.). Thus, execution of the statechart may refer to direct execution or interpretation of program instructions represented by the statechart and/or execution of program instructions compiled or derived from the statechart.

The wires connecting the state icons may represent state transitions between the states. For example, a first state (represented as a first state icon in the statechart) may be linked to a second state (represented as a second state icon) via a transition (represented as a wire). The transition may have associated triggers, guards, and/or actions associated with the transition. For example, during execution of the statechart, an event may occur and may be specified as a trigger for the transition. Accordingly, the guards (or conditions associated with the transition) may be evaluated to determine if the transitions action should be performed or executed. If the conditions are met, the action may be performed, e.g., to execute code associated with the transition. Note that the transition (represented by the wire) may have any combination of associated triggers, guards, or actions. For example, in simple cases, the wire may only have associated triggers which result in a transition from, in this example, the first state to the second state.

In various embodiments, the wire may include an affordance for configuring the transition (e.g., to specify the triggers, guards, and/or actions of the transition). The affordance may be represented as an icon displayed on or proximate to the wire. As used herein, the term "proximate" is intended to indicate an association between the two objects, which, in this case, is the icon and the first wire. In some embodiments, proximate may mean within one or more centimeters or an inch. Alternatively, proximate may mean within a given number of pixels on the display, e.g., 50 or 100 pixels. In other words, the term 'proximate' in this context means that the affordance is sufficiently close to the wire such that a user would understand an association between the affordance and the wire.

In some embodiments, the icon representing the affordance (or the wire itself) may visually indicate the associated triggers, guards, and/or actions. For example, the icon may appear as an arrow with three connected rectangles. Each rectangle may be colored or filled in to represent whether the represented transition has respective triggers, guards, and/or actions. The specific number or location of the filled in or colored rectangles may indicate which of these triggers, guards, and/or actions are associated with the transition. Thus, a single filled in rectangle may indicate that only triggers are associated with the transition. Note that these visual indications and descriptions are exemplary only and other embodiments are envisioned. For example, the affordance or wire may take on varying appearances to visually indicate the specific triggers, guards, and/or actions that are associated with the transition. Note that the icon may represent a configurable logic node or transition node. Additionally, configuration of the logic node may correspond to configuration of the wire. Further descriptions regarding configuration of the wire and/or logic node are provided below.

In some embodiments, the statechart may include pseudostates (e.g., forks, joins, and/or junctions). In some embodiments, pseudostates (or certain types thereof) may provide conditional branching for transitions in the statechart. For example, a state icon may be wired to a pseudostate in the statechart and multiple other wires may connect the pseudostate to other state icons in the diagram. Each of these wires may represent transitions with associated triggers, guards, and/or actions (as described above). Thus, the pseudostate may allow for conditioned branching of transitions in the statechart. Note that in various embodiments, transitions between states (e.g., single states, superstates, substates, or concurrently active states) and/or pseudostate may be ordered according to configured priorities (e.g., as specified by the user). These priorities may be assigned using explicit specification (e.g., using labels) or implicit specification (e.g., using orientation or directionality of the wires in the statechart).

During execution, the statechart may react to different events. Each of the states and transitions (among other elements of the statechart) may react to different events during execution of the statechart. In one embodiment, a first state may transition to a second state in response to an event. This may occur, for example, where the first state has a transition whose trigger (possibly among a plurality of triggers) is the event. In some embodiments, the transition may have "guards" or conditions which determine whether or not the transition should occur. If the guards are satisfied (i.e., if the conditions are met), the first state may exit (and possibly execute an action associated with exiting of that state), the transition may occur (and similarly execute associated actions), and the second state may be entered. Actions may then be taken based on the entrance of the second state (which itself is an event). However, it should be noted that actions may be taken even when states are not entered or exited. For example, a state may perform an action in response to a trigger without an entrance or exit of that state. Thus, statecharts may be a reactive programming paradigm in which actions are taken in response to events. Note that multiple actions or transitions may occur in response to events. In some embodiments, as indicated above, the transitions or actions may be prioritized, which may be specified implicitly or explicitly, e.g., by a user. Thus, statecharts may execute and perform actions in response to events.

FIG. 2 illustrates an exemplary statechart in a statechart development environment. As shown, the statechart development environment may include a statechart window 200 which shows the statechart. Additionally, one or more graphical user interfaces (GUIs) that are associated with the statechart may be displayed. In this case, the statechart has two associated GUIs 280 and 290. GUI 280 corresponds to state data and may display an indicator, e.g., during execution of the statechart, which indicates the current active state. GUI 290 includes a count output indicator which may show the current count value for the statechart, e.g., during execution of the statechart. As shown, the statechart includes state icons representing states of the statechart. As shown, the statechart includes a state icon 202 which represents an initial state, state icon 204 which represents state A, state icon 206 which represents state B, and a state icon 208 which represents an ending state. As indicated by the text displayed in the states, Booleans associated with each state are turned to TRUE or FALSE when the state is entered or exited respectively. Additionally, a count value is increased every time a state is exited. As described above, these values are displayed in the GUIs 280 and 290.

Furthermore, the statechart includes a plurality of transitions which are indicated by wires. As shown, wire 212 indicates a transition from the initial state to state A, wire 214 indicates a transition from state A to state B, wire 216 indicates a transition from state B to state A, wire 218 indicates a transition from state A to the ending state, and wire 220 indicates a transition from state B to the ending state. Each wire includes an affordance for configuring the wire. In some embodiments, this affordance may be referred to as a logic node or transition node. In various embodiments, configuring the wire and/or configuring the logic node displayed on the wire may refer to the same action of configuring triggers, guards, and/or actions for the wire. Further descriptions regarding configuration of the wires/transitions represented by the wires are provided below. As also shown, each wire or transition may have an associated label displayed proximate to the wire or logic node of the wire.

Thus, FIG. 2 illustrates an exemplary statechart window which includes a statechart and GUIs which may display data regarding the statechart (e.g., during execution of the statechart).

Figure 3:
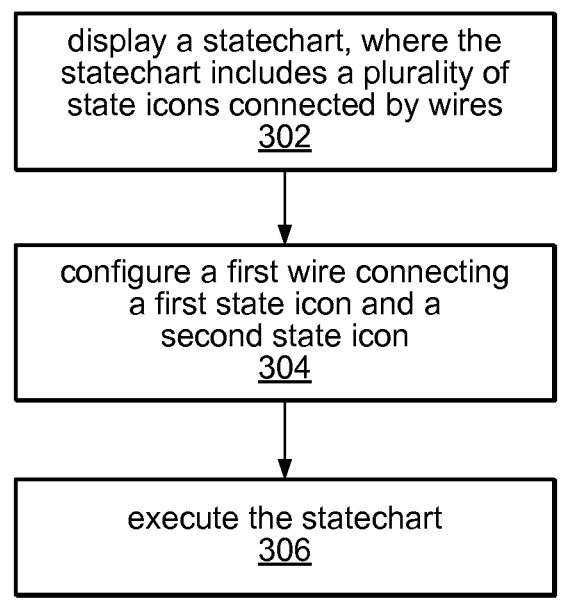
FIG. 3 is a flowchart diagram illustrating one embodiment of a method for configuring wires in a statechart.

FIG. 3—Configuring Wires in a Statechart

FIG. 3 illustrates a method for configuring wires in a statechart. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, a statechart may be created or displayed on a display, e.g., of the computer system 82. The statechart may be executable by a computer (e.g., the computer system 82) to perform first functionality. Additionally, in some embodiments, the statechart may be included as a node in a graphical program. As described above, the statechart may include a plurality of state icons connected by wires, where the state icons represent states and the wires represent transitions between the states. As also indicated above, the statechart may have hierarchical relationships in states. In other words, the statechart may include superstates which include substates.

Note that the statechart may be displayed in response to user input. In one embodiment, the statechart may be displayed after a user has chosen to open the statechart (e.g., where the statechart has already been created). Alternatively, the statechart may be displayed during or after creation of the statechart. The statechart may be created manually or automatically, as desired. For example, the statechart may be created or assembled by the user arranging on a display a plurality of state icons and then connecting the state icons to create the statechart. In response to the user assembling the statechart, data structures may be created and stored which represent the statechart.

Alternatively, the user may provide textual input (e.g., to the development environment) and a statechart may be created based on the textual input. The textual input may fully specify the statechart or may partially specify the statechart. Partially specifying the statechart may include specifying desired functionality and/or portions of the states/transitions of the statechart. In one embodiment, the user may provide input to a GUI or series of GUIs (e.g., in a wizard) in order to specify the statechart. The statechart may be automatically created or displayed in response to receiving the user input. Note that automatic creation of the statechart does not require user input manually assembling state icons and wires (e.g., according to the methods described above). Thus, following descriptions from above, the user may provide input specifying functionality and/or portions of the statechart, and the statechart may be automatically created and displayed in response to the user input. Similar descriptions regarding the automatic creation of graphical programs and/or state diagrams can be found in various ones of the documents incorporated-by-reference above.

In some embodiments, the statechart may include a first state icon and a second state icon (e.g., which were assembled by the user using techniques described above). The first state icon and the second state icon may be connected via a first wire, e.g., in response to user input. The state icons may represent any kind of state as desired. For example, the state icons may represent states, superstates, substates, pseudostates, or any other type of state which may be displayed in a statechart. Thus, displaying or creating the statechart may include displaying a first state icon and a second state icon which are connected by a first wire (which represents a first transition).

Figure 4:
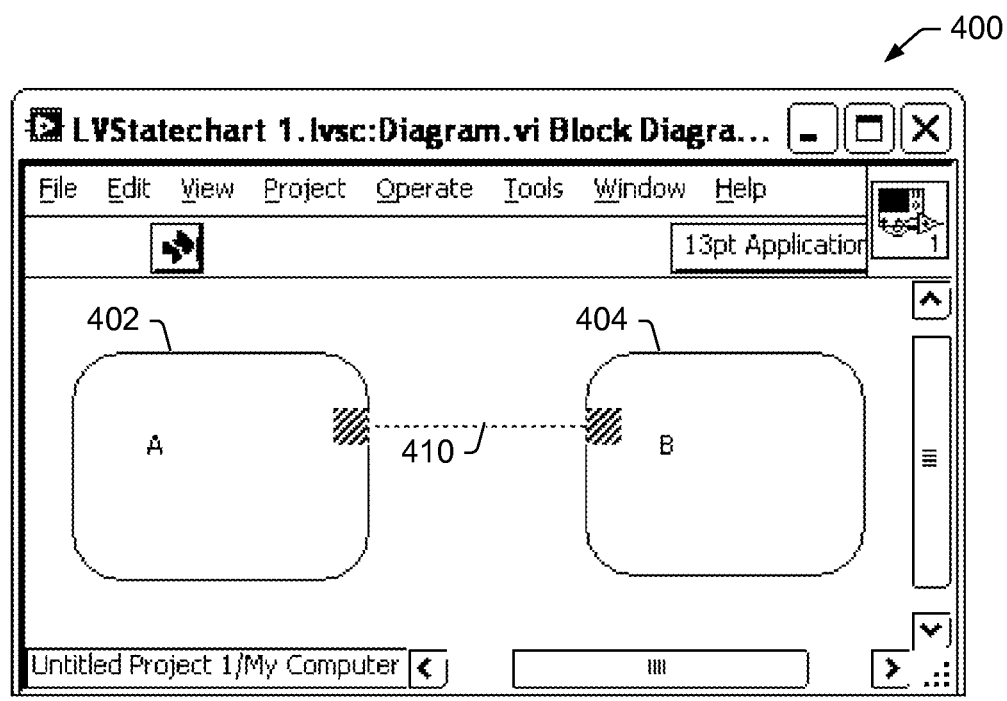
FIGS. 4-7 are exemplary screen shots corresponding to an embodiment of the method of FIG. 3.
Figure 5:
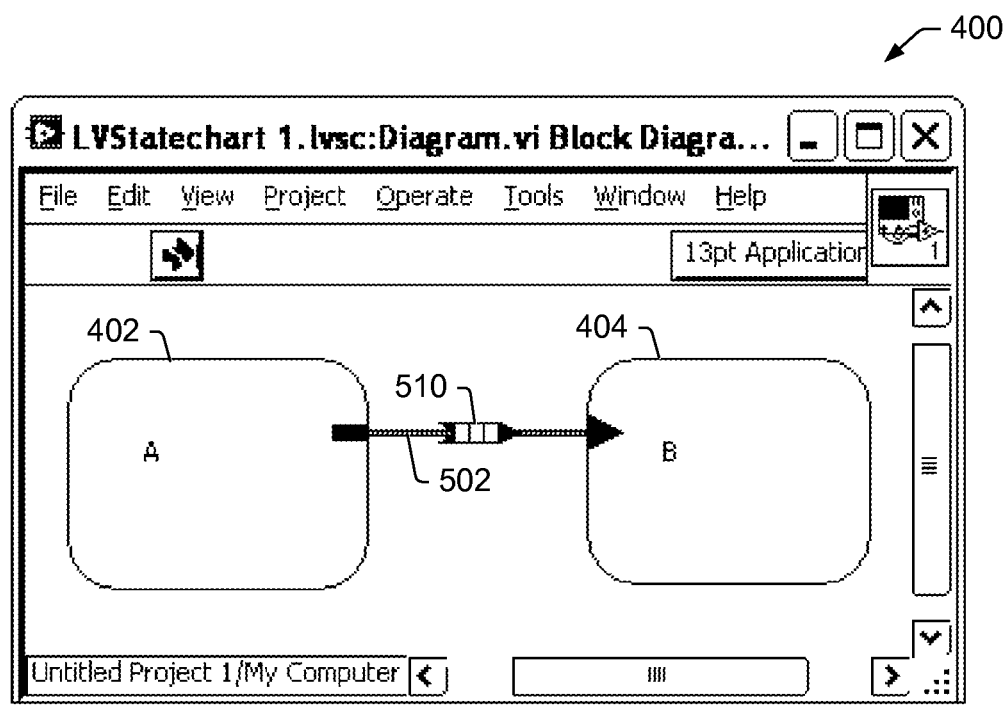
Figure 6:
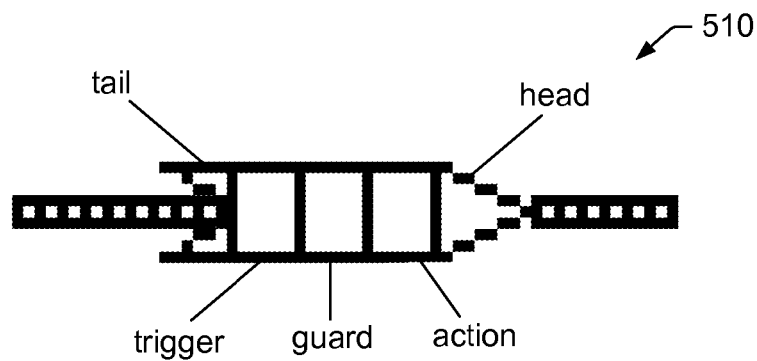

FIG. 4 illustrates a statechart 400 with a first state icon 402 (representing state A) and a second state icon 404 (representing state B). The dotted line 410 indicates the formation of a transition between state A and state B. In various embodiments, the transition between the states may be formed by automatically or manually, as desired. For example, the user may select the first state icon 402 and then the second state icon 404, e.g., by clicking the first state icon and then releasing on the second state icon. In one embodiment, the user may use a wiring tool to form the transition. Correspondingly, FIG. 5 illustrates the state icon 402 connected to the state icon 404 by wire 502. Additionally, the wire includes an affordance or logic node 510. As indicated above, the affordance or logic node may represent or be used for configuration of the wire. FIG. 6 illustrates a close up of the logic node 510. As shown, the logic node 510 may include a head, a tail, as rectangles for triggers, guards, and/or actions. These rectangles may indicate whether respective triggers, guards, and/or actions have been configured for the wire, e.g., by the user.

Note that the affordance or logic node may be displayed in the outermost region of the statechart. For example, where the wire passes between superstate boundaries, the logic node may be displayed outside the superstates (e.g., even if the wire originally began in a substate of one of the superstates. Alternatively, if the transition is between two substates in a superstate, the logic node may be displayed outside of the substates but inside of the superstate. Note that the location of the logic node may visually indicate priorities of the transition. For example, a transition outside of a state may have an implicit higher priority than a transition within the state. This priority may be indicated based on the location of the logic nodes.

Thus, transitions may be evaluated in the order of the location of the logic nodes, e.g., outermost to innermost.

In 304, the first wire may be configured, e.g., by the user. Configuration of the first wire may include specification of one or more triggers, guards, and/or actions for the first wire. As indicated above, a user may configure the first wire (i.e., the transition represented by the first wire) by first selecting an affordance of the wire. The affordance of the wire may be the wire itself, and/or an icon displayed proximate to the wire. In some embodiments, the affordance may appear as a logic node displayed on the first wire. Note that configuration of the logic node and/or the wire (e.g., via the logic node or other affordance) may refer to the same action, i.e., configuration of the transition represented by the wire. Selecting the logic node may be performed by the user clicking (e.g., single clicking (e.g., left or right clicking) or double clicking) the logic node, e.g., using a mouse or other pointing device.

After selecting the wire, affordance, and/or logic icon of the first wire, the user may then specify desired triggers, guards, and/or events (among other possibilities) for the transition represented by the first wire. As described above, triggers may refer to the events which cause the transition to occur (or begin to occur), guards may refer to the conditions which must be met for the transition to occur, and actions may refer to the program code or procedures that may be performed during the transition. Note that in some embodiments, the actions may be performed or executed before completion of the transaction. However, in some embodiments, after an event specified by the trigger and/or the stipulated guards are satisfied, the associated actions may not be executed immediately. In one embodiment, the actions may be performed at any time (specified or otherwise) as long as deterministic execution still occurs. For example, the actions associated with the transition may occur after the transition completes.

As one specific example, a wire may be configured with the following trigger, guard, and action. The transition may trigger when the user presses a specific button, e.g., a transfer button. The guard for this transition may be, for example, whether the measured temperature is equal to or greater than 32 degrees Celsius. The action for the transition may be to transfer the liquid from a first container to a second container. Thus, a wire may be configured with triggers, guards, and/or actions.

In some embodiments, specifying the desired triggers, guards, and/or events may include receiving user input to a GUI or a series of GUIs (e.g., in a wizard) which guides the user through configuration of the wire/transition. Alternatively, or additionally, the user may specify the transitions directly, e.g., by typing or otherwise associating triggers, guards, or events with the transition. In some embodiments, the user may simply select each of the triggers, guards, and/or events from a list of possible triggers, guards, and/or events. Alternatively, or additionally, the user may specify the triggers, guards, and/or actions by creating or assembling a graphical program which specifies the triggers, guards, and/ or actions.

In one embodiment, the user may associate existing configurations with the first wire to configure the wire. For example, the user may select an already configured wire (e.g., from within the statechart or from other sources such as a palette) and associate the already configured wire with the first wire to configure the first wire. Thus, the first wire may be configured according to the triggers, guards, and actions of the already configured wire. Alternatively, the user may be able to specify individual triggers, guards, and/or actions (among other configurable elements) by associating respective existing triggers, guards, and/or actions with the wire (e.g., the logic node displayed proximate to the wire). For example, a user may select and associate a trigger portion (e.g., the rectangle representing the triggers) of an existing wire with the first wire, thereby configuring the trigger portion of the first wire. Similar remarks may apply to configuration of the guards and/or actions. Associating the wires, logic nodes, and/or portions of the logic nodes (such as the triggers, guards, and/or actions) may include dragging and dropping the existing elements on the first wire (or logic node of the first wire, among other options).

Note that in some embodiments, the first wire may be configured automatically based on configurations or information associated with the states represented by the state icons connected via the first wire. In one embodiment, the first wire (or transition represented by the first wire) may be configured automatically based on global policies (e.g., of the statechart, the project, and/or the development environment) or local policies (e.g., of the states between which the transition occurs or associated portions of the statechart). Alternatively, the first wire may be configured using default values. Thus, the transition may be configured via various means, e.g., via configuration of the first wire or logic node associated therewith.

Figure 7:
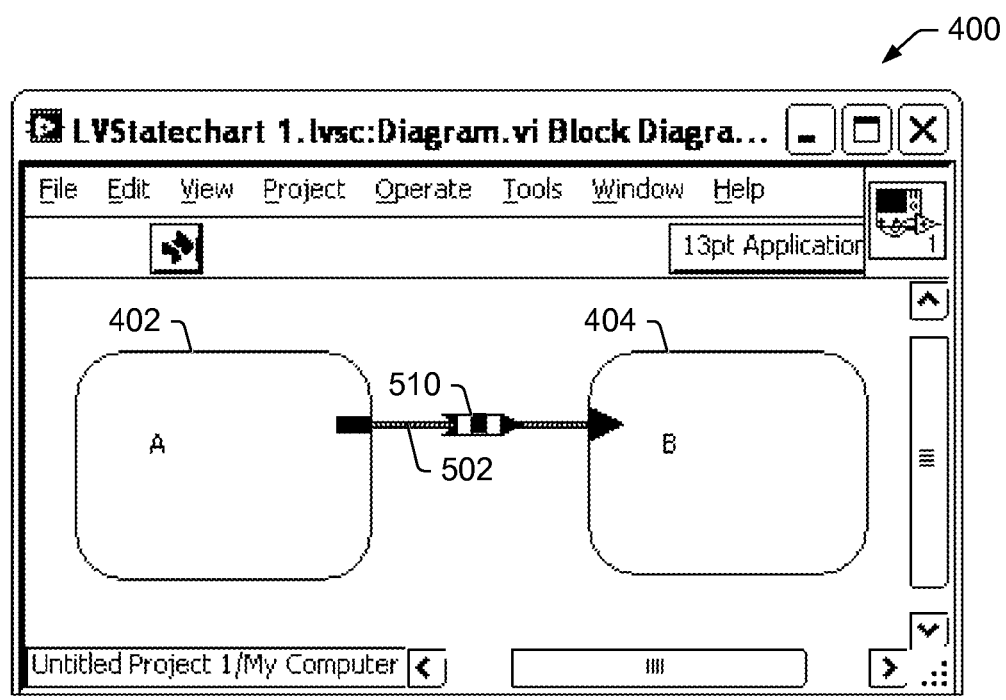

As indicated above, after configuration, the wire may visually indicate the specified configuration of the wire. As a simple case, the logic node on the wire may indicate whether triggers, guards, and/or actions are configured for the wire/transition. For example, FIG. 7 shows the results of configuration of the wire 502, e.g., via configuration of the logic node 510. As shown, the logic node 510 now visually indicates that the wire has no associated triggers or actions, but does have at least one associated guard. Note that the same technique may be used to indicate whether any combination of triggers, guards, or actions is configured for the wire.

In some embodiments, the wire may take on an appearance that indicates the specified configuration of the wire, e.g., in addition or as an alternative to the indicators on the logic node. For example, in one embodiment, the wire may take on a different color, size, or appearance based on the configuration of the wire. In some embodiments, the appearance of the wire may indicate general configuration of the wire (e.g., similar to the indicators in the logic node) or specific configuration of the wire. For example, the wire may be shown as a blue wire after configuration where it has a specific associated trigger. Alternatively, a configuration indicator icon may be displayed proximate to the wire to indicate the specified configuration of the wire. Thus, any number of graphical indications or wire appearances may be used to visually indicate the specific or general configuration of the wire. Additionally, it should be noted that the above appearances are exemplary only and that other visual indications are contemplated.

Note that the wire may also be configured to execute synchronously or asynchronously (e.g., using buffered semantics). Additionally, in some embodiments, the states may be executed over a distributed system and may require such asynchronous communication. Correspondingly, configuring the wire may include configuring communication policies or data transport protocols/mediums for the wire. In some embodiments, visually indicating the configuration of the wire may visually indicate such communication policies, data transport protocols, and/or mediums for the wire (e.g., possibly in addition to the indications of the triggers, guards, and/or actions of the transition/wire).

In 306, the statechart may be executed. During execution, the statechart may transition between the states as specified by the configuration of the transitions in the diagram. For example, following the descriptions regarding FIGS. 4-7, state A may transition to state B only when the guards of the configured transition are satisfied. Thus, during execution of the statechart, transitions may occur according to the configurations of the transitions in the statechart.

Figure 8:
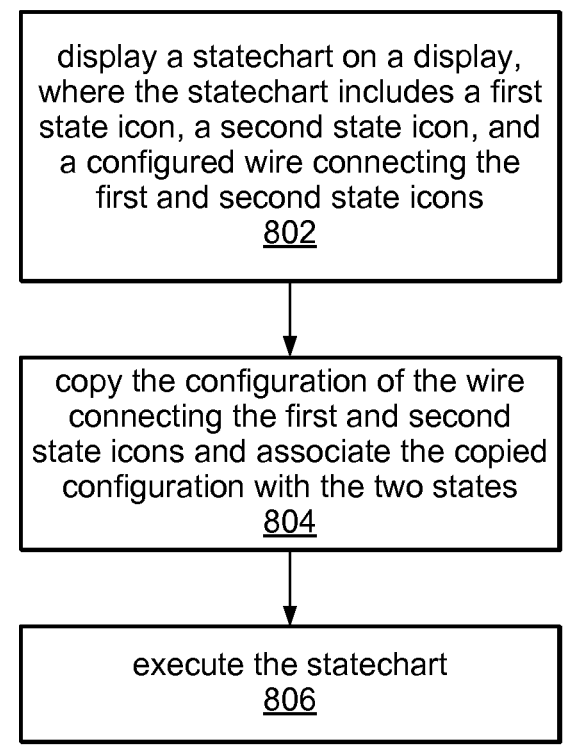
FIG. 8 is a flowchart diagram illustrating one embodiment of a method for configuring a wire in a statechart.

FIG. 8—Method for Configuring a Wire in a Statechart

FIG. 8 illustrates a method for configuring a wire in a statechart. The method shown in FIG. 8 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 802, a statechart may be displayed. As indicated above, the statechart may include a plurality of state icons representing states as well as wires between the icons (representing transitions between the states). The statechart may be executable to perform functionality represented by the state icons and wires (among other elements of the statechart). As also indicated above, displaying the statechart may be performed in response to user input opening an existing statechart or creating the statechart, e.g., manually or automatically. For example, the statechart may be displayed during creation of the statechart.

The statechart may include two state icons that are connected by a wire. The wire may have been configured using any of the methods described herein (among others). In some embodiments, the user may wish to duplicate or copy the configuration of the wire and apply that configuration to first and second states of the statechart. Correspondingly, in 804, the user may copy and associate the configuration of the wire with the first and second states. In various embodiments, the first and second states may be the same states that were connected by the wire or any combination of states represented by the statechart.

Associating the configuration of the wire with the first state icon (representing the first state) and the second state icon (representing the second state) may include dragging the wire (or the logic node of the wire) between the two states. For example, the existing wire may be displayed in the display and dragging the wire may duplicate the wire for association with two or more states in the state diagram. Alternatively, the user may drag an existing wire (or logic node) from a palette and associate that with two states in the diagram. Note that one or more wires may appear in the palette as the user configures wires. Thus, the palette may store default configured wires or wires already configured by the user. In some embodiments, the user may choose to make an existing configured wire a template wire before it appears in the palette. Alternatively, one or more wires that are configured in a particular statechart may be displayed in the palette of that statechart.

In one embodiment, the user may perform a copy operation (e.g., using various key commands, mouse commands, mouse gestures, or combinations thereof) and paste operation in the statechart. For example, the user could select an existing wire and press a copy key command (such as CONTROL-C) and then press a paste key command (such as CONTROL-V) to paste the copied wire or logic node in the diagram. In some embodiments, the user may select a desired area (e.g., portion of the statechart and/or icon(s) for associating the wire or node, among others) for pasting the wire or logic node. Alternatively, the user could select the icon or wire and hold down a key while dragging the wire or logic node (e.g., CONTROL).

Figure 9A:
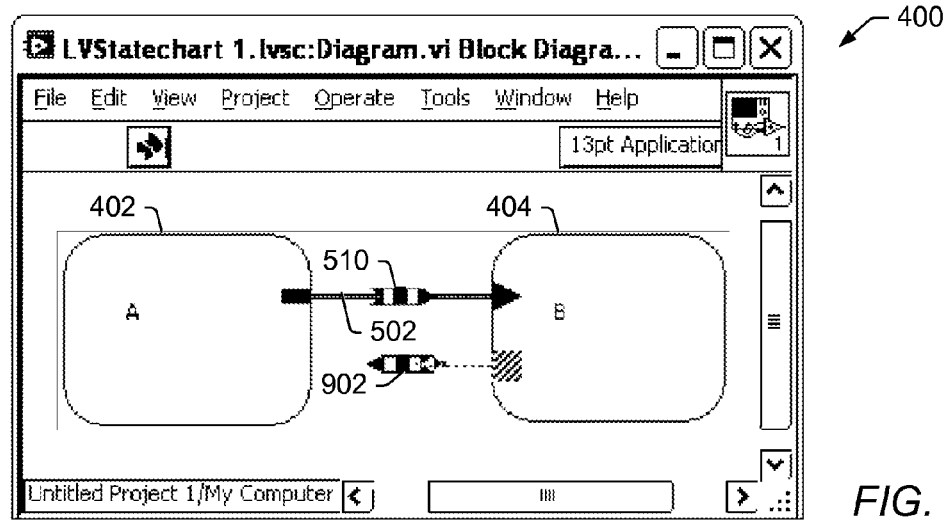
FIGS. 9A-9C are exemplary screen shots corresponding to an embodiment of the method of FIG. 8.
Figure 9B:
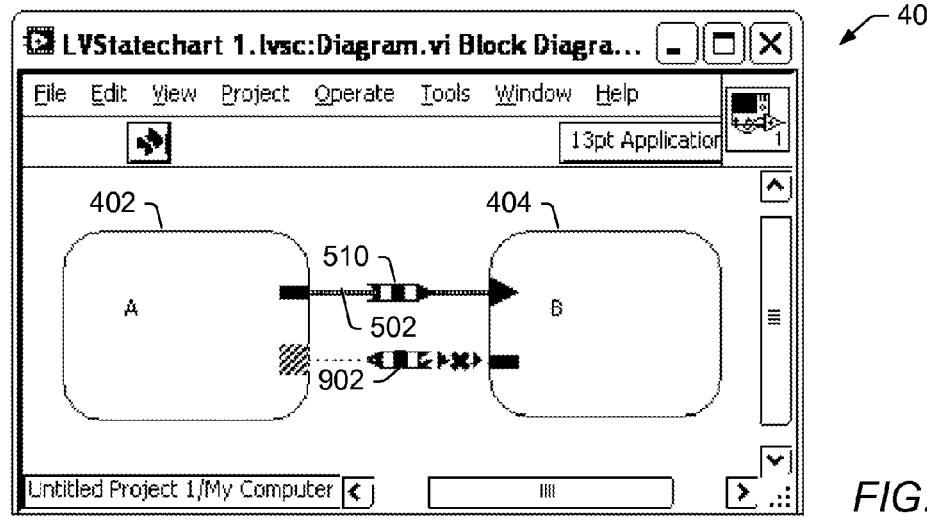
Figure 9C:
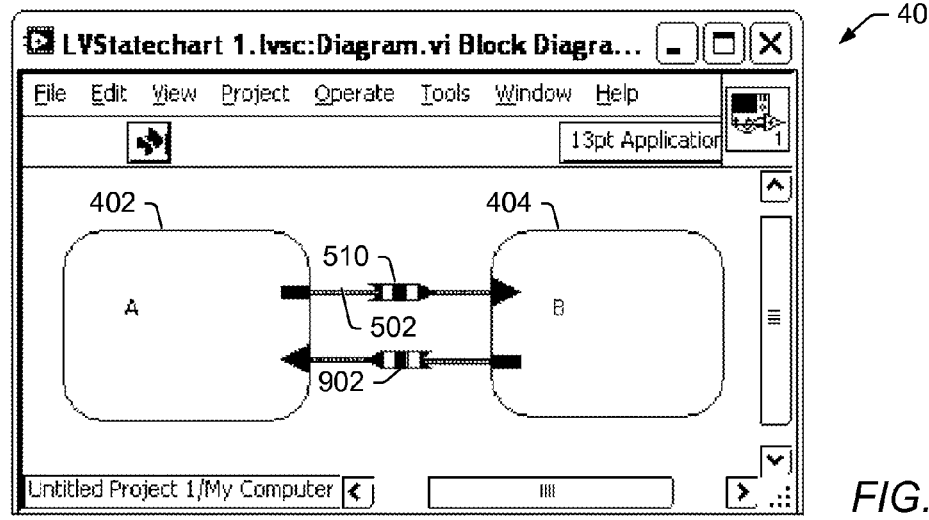

FIGS. 9A-9C illustrate an exemplary copy and paste walk through. As shown in FIG. 9A, existing wire 502 is configured according to the logic node 510. Additionally, the logic node 510 has been copied and pasted below the wire 502 as logic node 902. In FIGS. 9B and 9C, the logic node is connected to state icons 404 and 402 with a B to A directionality. Thus, the user has copied and associated an existing configuration (where one or more guards are specified) and used that configuration to create a new transition. Note that in one embodiment, the user may not need to manually connect the node to the two states, and instead, node may be automatically connected to the nearest available states. Alternatively, the node may be connected to the nearest available states that make sense, e.g., based on the functionality of the statechart.

In some embodiments, existing configured wires may be displayed in other locations other than the statechart. For example, there may be a palette of configured wires that the user may utilize for creating new wires. Thus, the user may utilize an already configured wire to create a new transition between states in a statechart. Note that in some embodiments, one or more of the assigned triggers, guards, or actions (among other configurations) may not make sense or may not be compatible with the new states. In such cases, the configuration of the new wire may be modified from the existing wire automatically. In some embodiments, the automatic modification of the configuration may occur based on analysis of the endpoints, global policies, local policies, and/or other factors.

In 806, the statechart may be executed. During execution, the statechart may transition between the states as specified by the configuration of the transitions in the diagram. Thus, during execution of the statechart, transitions may occur according to the configurations of the transitions in the statechart.

Figure 10:
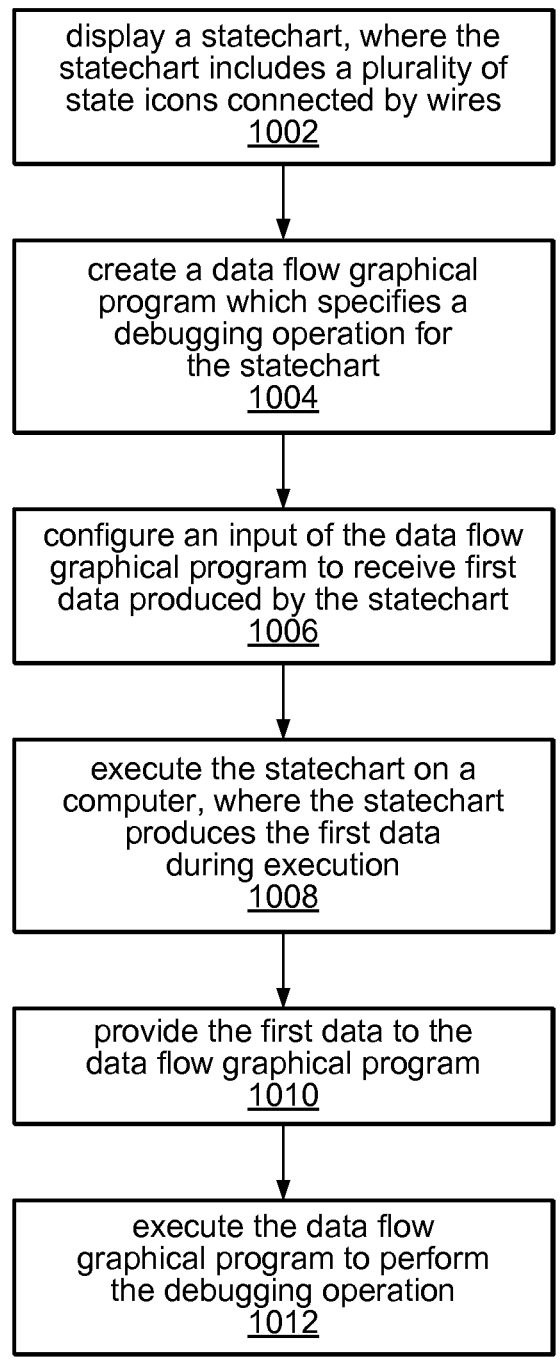
FIG. 10 is a flowchart diagram illustrating one embodiment of a method for debugging a statechart.

FIG. 10—Method for Debugging a Statechart

FIG. 10 illustrates a method for debugging a statechart. The method shown in FIG. 10 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1002, a statechart may be displayed. As indicated above, the statechart may include a plurality of state icons representing states as well as wires between the icons (representing transitions between the states). The statechart may be executable to perform functionality represented by the state icons and wires (among other elements of the statechart). As also indicated above, displaying the statechart may be performed in response to user input opening an existing statechart or creating the statechart, e.g., manually or automatically.

The statechart may include one or more variables that may be used for debugging or outputting. For example, during creation of the statechart, these variables may be created or specified, e.g., manually by the user or automatically by the statechart development environment. In one embodiment, state data variables which indicate the currently active state may be automatically created and updated during creation of the statechart. Other variables that may be created (automatically or manually) may include count variables (e.g., indicating the number of times states have been entered or exited), internal queue variables (e.g., buffers or arrays which store list(s) of executing or pending triggers/events), trigger variables (e.g., indicating current or pending triggers), and/or other variables. Note that these variables and data structures are exemplary only and that any other types of variables may be created as desired.

In 1004, a graphical program which specifies a debugging operation for the statechart may be created. As indicated above, the graphical program may include a block diagram portion and a GUI portion (which may be referred to as a front panel). The block diagram portion may include a plurality of interconnected nodes which visually indicate functionality of the graphical program. For example, each of the nodes may represent software functions or program code and may be connected via wires. The wires may indicate that data produced by one node is provided to another node in the graphical program. Thus, the graphical program may be a data flow graphical program where data is provided between nodes in the graphical program.

In various embodiments, the graphical program may be created automatically or manually as desired. During creation of the graphical program, in 806, one or more inputs of the graphical program may be configured to receive first data produced by the statechart. The first data may include one or more of the values of and/or the variables themselves that were created or specified during creation of the statechart. Thus, in various embodiments, the graphical program may receive data corresponding to the variables specified or created in the statechart. In one embodiment, the graphical program may include a single input which receives the entirety of the values and parses that data (e.g., the input may be an array input). Alternatively, the graphical program may receive data corresponding to each variable on respective inputs. Note that the graphical program may not utilize or necessarily receive input corresponding to every variable of the statechart, but may instead only receive data corresponding to a subset of the variables.

In one embodiment, the graphical program may be created automatically (e.g., by the development environment) and may simply display or visually indicate data of the variables in the front panel of the graphical program. Alternatively, the graphical program may be more complex. For example, the graphical program may specify various debugging operations such as logging the first data (or portions thereof) and/or halting execution of the statechart. Note that these debugging operations may be performed all the time or for a portion of the execution of the statechart, e.g., as specified by the graphical program. For example, the graphical program may specify conditions for when the statechart should be halted or for when various portions of the first data should be recorded. Note that the graphical program may also indicate how the data is logged. For example, the graphical program may perform one or more modifications or transformations on the data before it is logged.

Additionally, the graphical program may include buttons or other input elements which allow the user to interact or modify execution of the statechart (and/or the graphical program). For example, the front panel may include one or more GUI elements for halting execution of the statechart, slowing down execution of the statechart (e.g., to various rates or speeds), stepping through execution of the statechart, beginning or ending logging of data for one or more variables (or sets thereof), and/or other actions related to debugging the statechart. Note that the above described debugging operations and GUI elements are exemplary only and that other debugging operations/GUI elements are envisioned.

Note that the graphical program may or may not be displayed to the user. For example, for such simple cases, it may not be necessary to display the block diagram portion of the graphical program to the user, and instead the variables or state data may be displayed in a GUI (e.g., the front panel of the graphical program) on the display of the computer system.

The front panel of the graphical program may visually indicate values of variables of the statechart. For example, the front panel may include GUI elements which indicate state data such as the currently active state(s), currently executing triggers, pending external triggers, output information from the statechart (e.g., of local variables such as count variables), internal queue information, and/or other information related to execution of the statechart. As indicated above, the front panel may also include GUI input elements which allow the user to interact with execution of the statechart and/or the graphical program.

In various embodiments, the user may modify or rearrange the GUI elements and appearance of the front panel of the graphical program. Note that the front panel may have a first appearance that is automatically generated, but is thereafter customizable. The user may also modify the way that data is provided to or displayed from the statechart or graphical program. For example, the user may choose to view currently active states using LED indicators instead of BOOLEAN values. Alternatively, or additionally, the user may configure output information to be displayed in a graph or level indicator (among others). Thus, the user may configure the input and output elements of the front panel to take on any customized appearance as desired.

Thus, a graphical program may be created automatically or manually and may specify a debugging operation.

As indicated above, the variables may have been specified or created by the user during creation of the statechart, or may be default variables that are created or specified by the development environment. These variables may be visually indicated in the front panel of the graphical program.

In 1008, the statechart may be executed on a computer. During execution the statechart may produce the first data, and in 1010, the first data may be provided to the graphical program. In 1012, the graphical program may be executed to perform the debugging operation. During execution, the graphical program may display results of executing the graphical program, e.g., by displaying indications of the variables during execution of the statechart. For example, the front panel of the graphical program may include an indicator which visually indicates what state is currently active for the statechart. Correspondingly, during execution of the statechart and the graphical program, the indicator may visually indicate the currently active state.

Where the graphical program halts execution upon various conditions, the statechart may correspondingly halt execution when those conditions are met. Similarly, the graphical program may log data of one or more of the variables according to the debugging operation specified by the graphical program. These logs may then be used for future analysis.

Also, as indicated above, during execution of the statechart and the graphical program, the user may interact with the execution via the front panel. For example, the user may halt, slow down, or step through execution of the statechart. Additionally, or alternatively, the user may turn on or off logging of various sets of data received from the statechart (and possibly modified according to the graphical program). The user may also provide data which otherwise affects execution of the statechart or debugging operations performed by the graphical program. Thus, the graphical program may perform one or more debugging operations during execution of the statechart.

Figure 11:
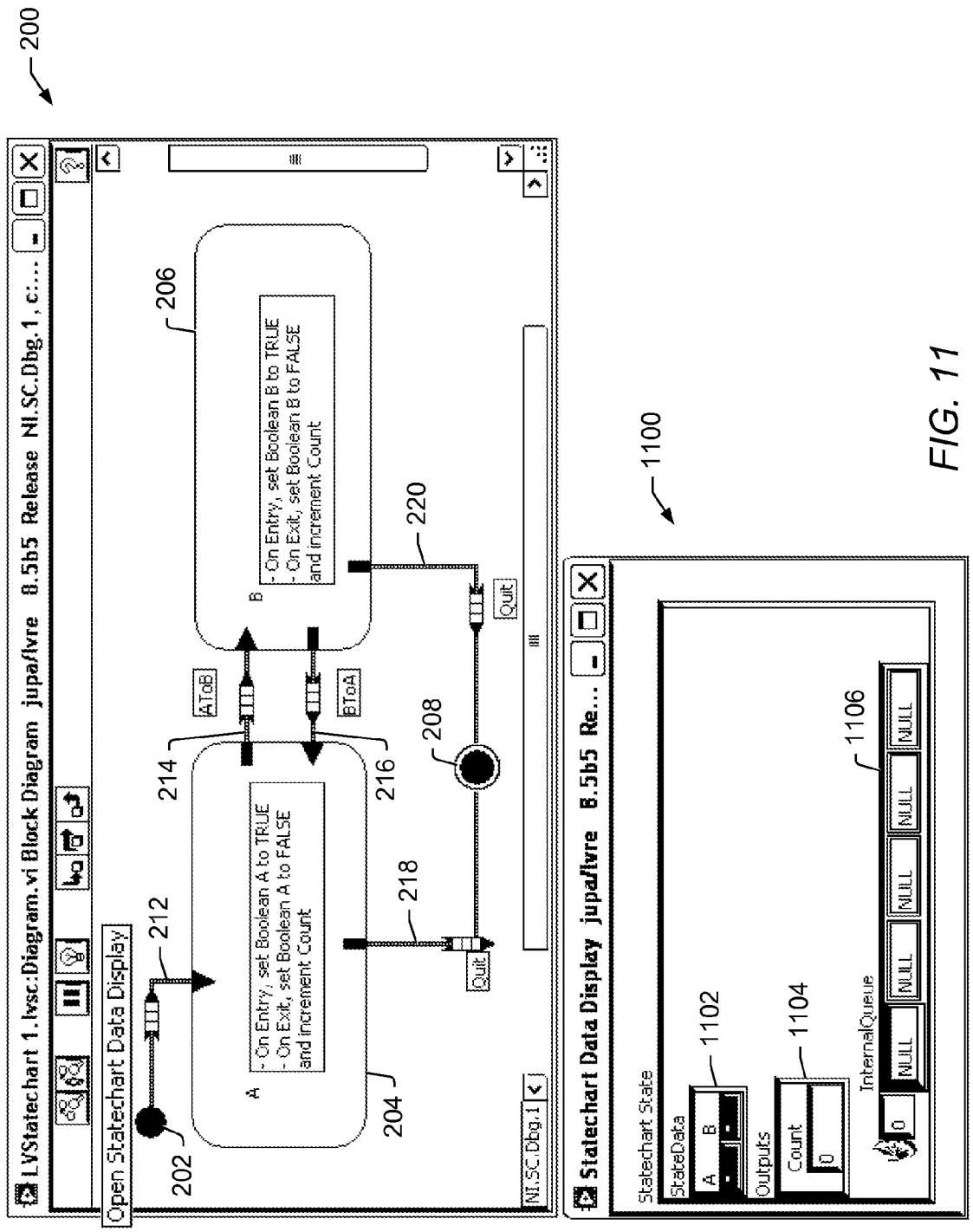
FIGS. 11-14 are exemplary screen shots corresponding to one embodiment of the method of FIG. 10.
Figure 12:
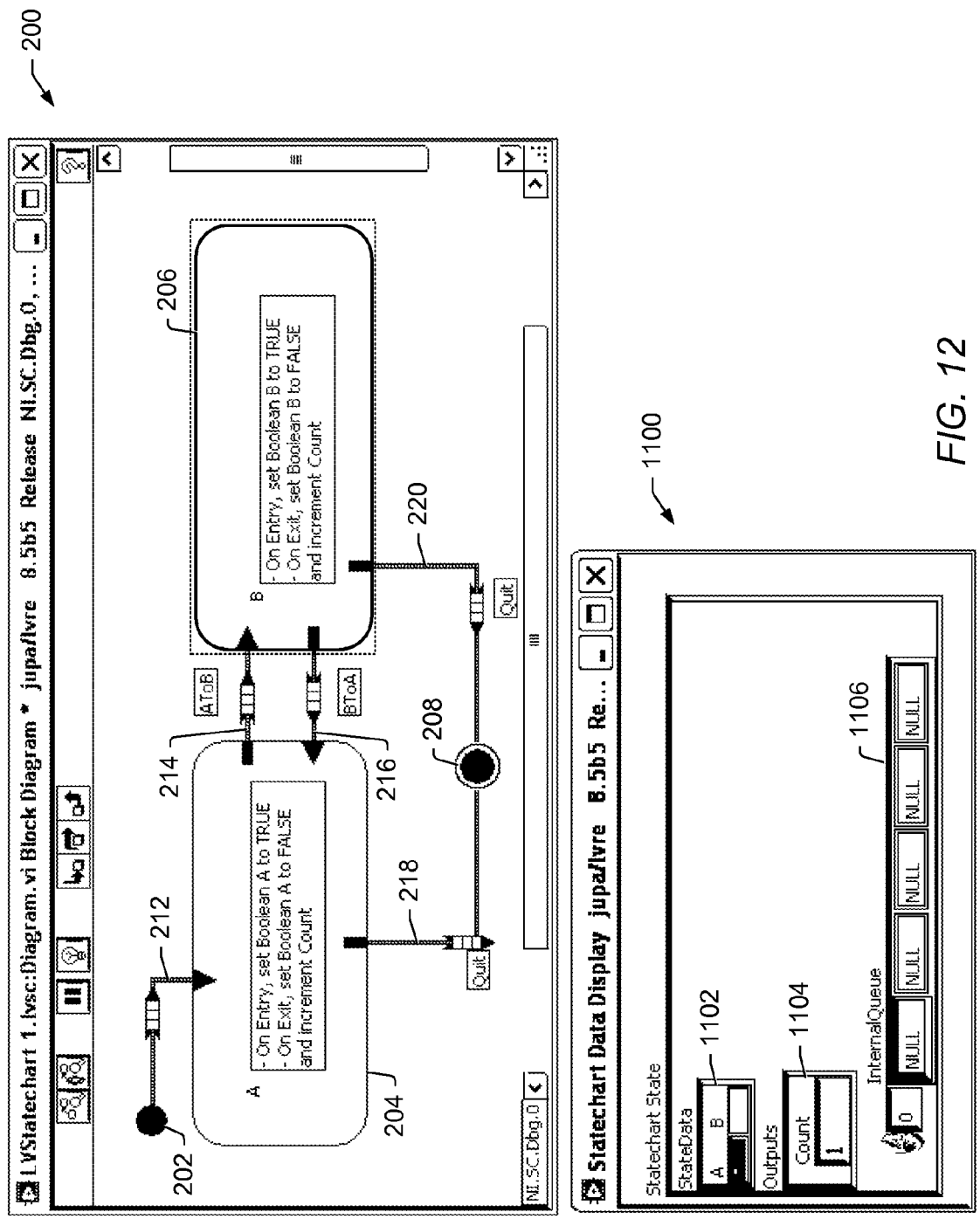

FIGS. 11-14—Exemplary Graphical Program for Performing a Debugging Operation FIGS. 11-14 are screenshots illustrating one embodiment for performing a debugging operation of a statechart. As shown in FIG. 11 (which follows from the exemplary statechart of FIG. 2), a data display window 1100 may be usable to visually indicate data corresponding to execution of the statechart 200. As shown, the data display window 1100 includes GUI element 1102 for indicating current state data, GUI element 1104 for indicating count variable data (in this case, how many times a state has been exited), and GUI element 1106 which indicates an Internal Queue of triggers. FIG. 12 is a screenshot of the statechart and data display window during execution. As shown, state B is currently being executed (indicated by highlighting or otherwise indicating state icon 206 and via the GUI element 1102), only one state has exited (from state A to state B as indicated in the GUI element 1104), and no triggers are pending (as indicated by the GUI element 1106). Thus, FIG. 12 illustrates an exemplary data display window during execution of the statechart. Note that the data display window could include any number of GUI elements such as a stop and start GUI element for halting or resuming execution of the statechart (such as GUI element 1302).

Figure 13:
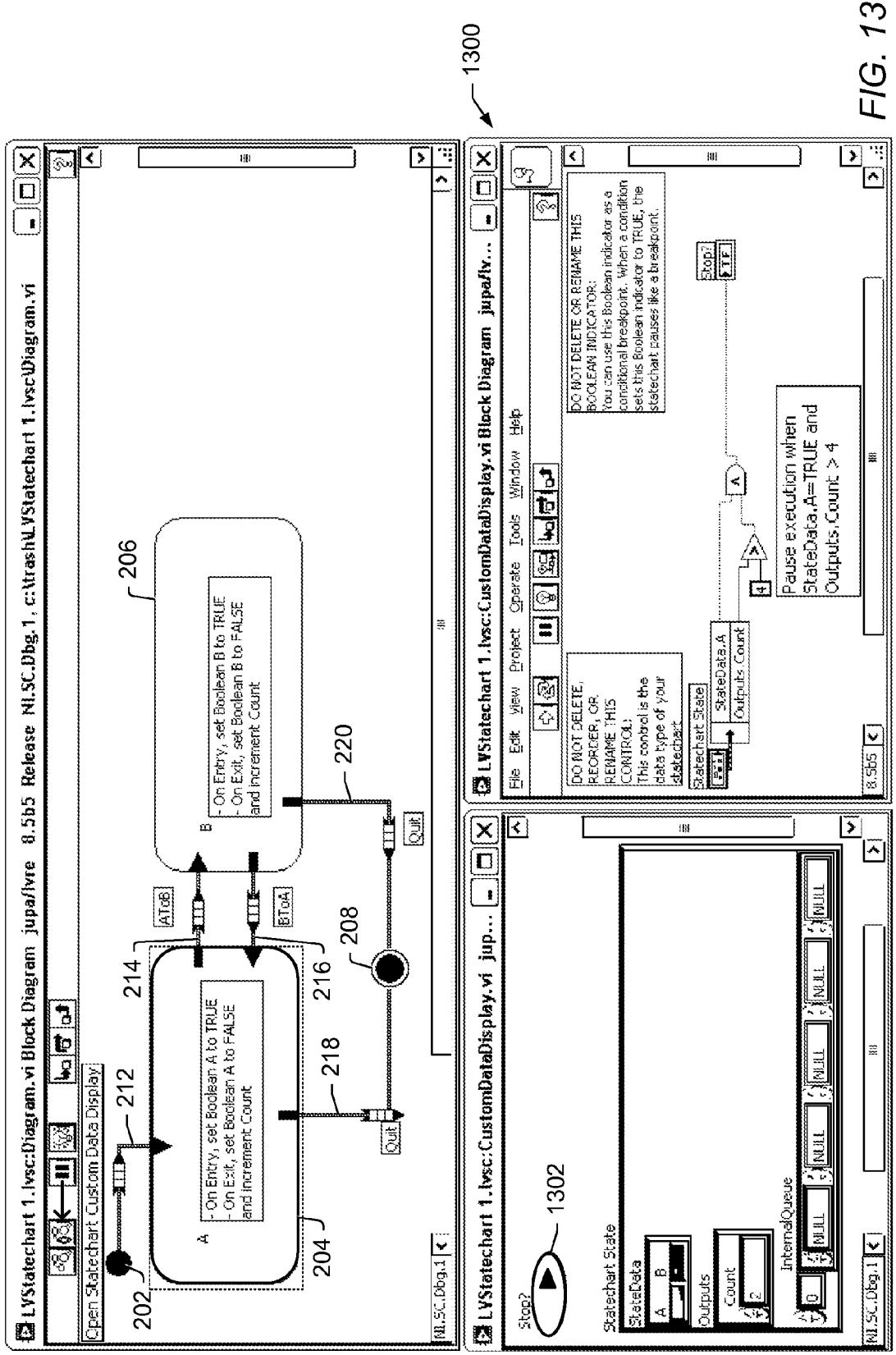
Figure 14:
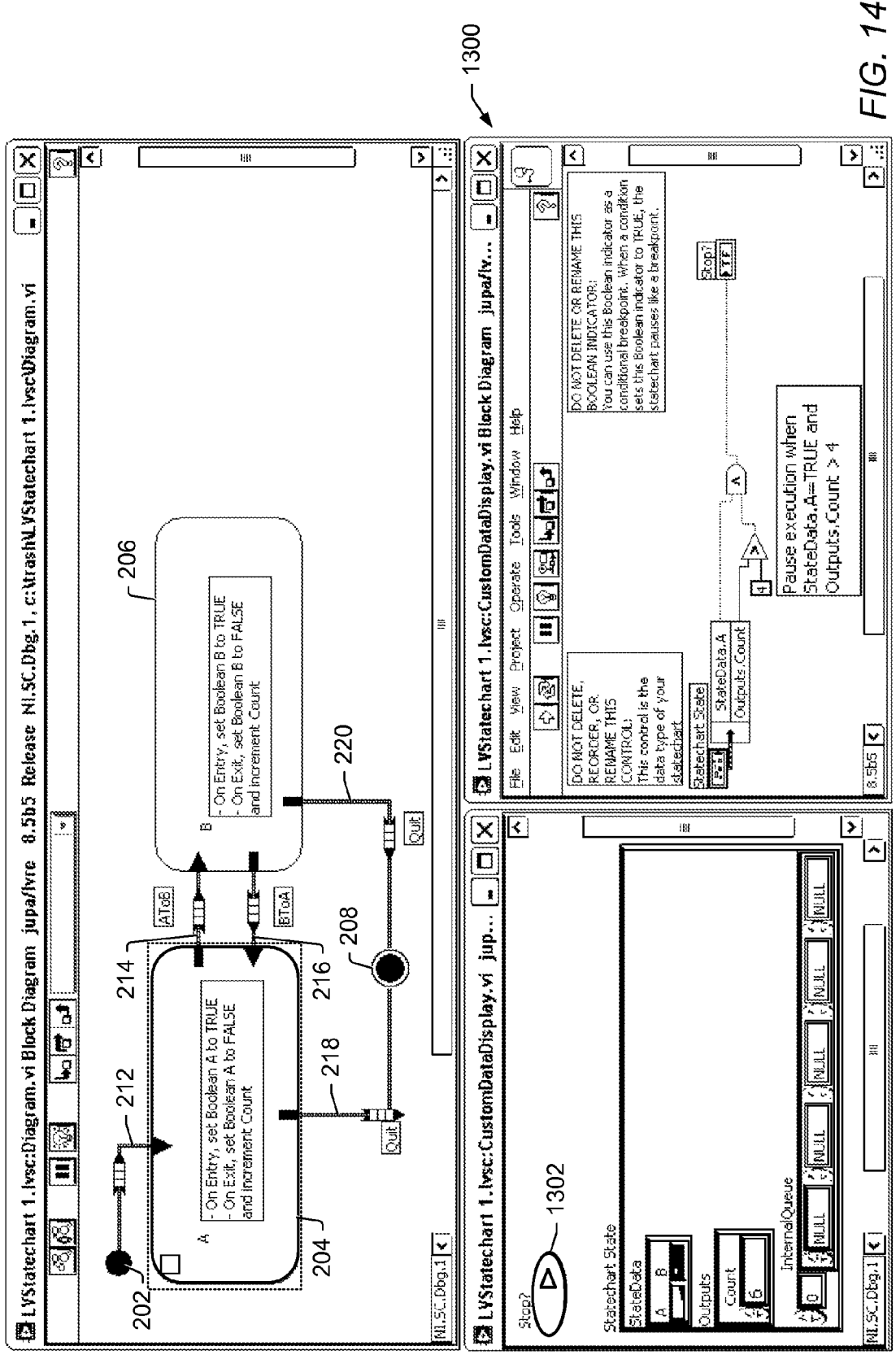

FIG. 13 illustrates a more complex example. As shown, the data display window includes GUI element 1302, and a graphical program 1300 is also displayed. As also shown, the graphical program receives input from the statechart (e.g., during execution). Among the input is StateData.A (indicating whether state A is active or not) and Outputs.Count (indicating the current number of times a state has exited). As shown, the graphical program specifies that when state A is active and the count variable exceed 4, execution of the statechart will cease. As shown, the statechart has transitioned from A to B and back again (indicated by the count value), and is currently in state A. In FIG. 14, the statechart has halted execution when state A is active and the count value exceeds 4 (in this case, the value is 6). Thus, FIGS. 13 and 14 illustrate a more complex example where a graphical program halts execution of the statechart by using data provided from the statechart during execution.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for debugging a statechart, comprising:
displaying the statechart on a display, wherein the statechart comprises a plurality of state icons connected by wires, wherein the state icons correspond to respective states and wherein the wires correspond to transitions to/from the states, wherein the statechart is executable by a computer to perform first functionality;
creating a data flow graphical program in response to user input, wherein the data flow graphical program comprises a plurality of interconnected nodes, wherein connections between nodes indicate that data produced by one node is used by another node, wherein the data flow graphical program specifies a debugging operation for the statechart;
configuring an input of the data flow graphical program to receive first data produced by the statechart;
executing the statechart on a computer, wherein the statechart produces the first data during said executing;
providing the first data to the data flow graphical program;
executing the data flow graphical program to perform the debugging operation based on the first data;
wherein the debugging operation is useable to aid in debugging the statechart.

2. The method of claim 1, further comprising:
displaying results of said executing the data flow graphical program.

3. The method of claim 1, wherein the debugging operation comprises a halt execution operation, wherein the data flow graphical program specifies the halt execution operation using the first data.

4. The method of claim 1, wherein the debugging operation comprises a data logging operation, wherein the data flow graphical program specifies when and/or how data is logged using the first data.

5. The method of claim 1, further comprising:
displaying graphical indications of the first data during execution of the statechart.

6. The method of claim 1, further comprising:
displaying a graphical user interface (GUI) during execution of the statechart, wherein the GUI comprises one or more elements which indicate portions of the first data.

7. The method of claim 6, wherein the GUI comprises a first GUI element which is useable to slow down execution of the statechart and/or the data flow graphical program.

8. The method of claim 6, wherein the GUI comprises a first GUI element which is usable to halt execution of the statechart and/or the data flow graphical program.

9. The method of claim 6, wherein the GUI comprises a first GUI element which is usable to step through execution of the statechart and/or the data flow graphical program.

10. The method of claim 6, wherein the GUI comprises:
a GUI element which displays state data;
a GUI element which displays outputs from the statechart; or
a GUI element which displays internal queue information.

11. The method of claim 6, wherein the GUI comprises;
a GUI element for receiving user input, wherein data received to the GUI element is usable for performing the debugging operation.

12. The method of claim 6, wherein the first data used by the data flow graphical program is displayed in the GUI.

13. The method of claim 6, further comprising:
receiving user input modifying an appearance of the GUI.

14. The method of claim 13, wherein said receiving user input modifying an appearance of the GUI comprises one or more of:
receiving user input arranging the one or more elements; or
receiving user input modifying an appearance of an element of the one or more elements.

15. The method of claim 1, further comprising:
receiving user input specifying one or more variables usable for performing the debugging operation, wherein the first data includes data associated with the one or more variables.

16. A non-transitory computer accessible memory medium comprising program instructions for debugging a statechart, wherein the program instructions are executable to:
display the statechart on a display, wherein the statechart comprises a plurality of state icons connected by wires, wherein the state icons correspond to respective states and wherein the wires correspond to transitions to/from the states, wherein the statechart is executable by a computer to perform first functionality;
create a data flow graphical program in response to user input, wherein the data flow graphical program comprises a plurality of interconnected nodes, wherein connections between nodes indicate that data produced by one node is used by another node, wherein the data flow graphical program specifies a debugging operation for the statechart;

configure an input of the data flow graphical program to receive first data produced by the statechart;

execute the statechart on a computer, wherein the statechart produces the first data during said executing;

execute the data flow graphical program to perform the debugging operation based on the first data;

wherein the debugging operation is useable to aid in debugging the statechart.

17. The non-transitory computer accessible memory medium of claim 16, wherein the program instructions are further executable to:

display results of said executing the data flow graphical program.

18. The non-transitory computer accessible memory medium of claim 16, wherein the program instructions are further executable to:

display a graphical user interface (GUI) during execution of the statechart, wherein the GUI comprises one or more elements which indicate portions of the first data.

19. The non-transitory computer accessible memory medium of claim 16, wherein the GUI comprises:

a GUI element which displays state data;

a GUI element which indicates currently active states;

a GUI element which indicates an array of pending external triggers;

a GUI element which indicates currently executing triggers;

a GUI element which displays outputs from the statechart;

a GUI element which displays internal queue information;

a GUI element which halts execution of the statechart and/or the data flow graphical program;

a GUI element which slows down execution of the statechart and/or the data flow graphical program;

a GUI element which steps through execution of the statechart and/or the data flow graphical program; or a GUI element for providing input to the statechart and/or the data flow graphical program.

20. A system, comprising:

a processor; and a memory medium coupled to the processor, wherein the memory medium comprises program instructions executable by the processor to:

display the statechart on a display, wherein the statechart comprises a plurality of state icons connected by wires, wherein the state icons correspond to respective states and wherein the wires correspond to transitions to/from the states, wherein the statechart is executable by a computer to perform first functionality;

create a data flow graphical program in response to user input, wherein the data flow graphical program comprises a plurality of interconnected nodes, wherein connections between nodes indicate that data produced by one node is used by another node, wherein the data flow graphical program specifies a debugging operation for the statechart;

configure an input of the data flow graphical program to receive first data produced by the statechart;

execute the statechart on a computer, wherein the statechart produces the first data during said executing;

execute the data flow graphical program to perform the debugging operation based on the first data;

wherein the debugging operation is useable to aid in debugging the statechart.

\* \* \* \* \*